United States Patent [19]

Marks et al.

[11] Patent Number: 5,156,918

[45] Date of Patent: Oct. 20, 1992

[54] SELF-ASSEMBLED SUPER LATTICES

[75] Inventors: Tobin J. Marks, Evanston, Ill.; DeQuan Li, Los Alamos, N. Mex.

[73] Assignee: Northwestern University, Evanston, Ill.

[21] Appl. No.: 676,992

[22] Filed: Mar. 28, 1991

[51] Int. Cl.$^5$ ............................................. B32B 9/04
[52] U.S. Cl. ................................ 428/447; 428/429; 428/448
[58] Field of Search ...................... 428/447, 448, 429

[56] References Cited

U.S. PATENT DOCUMENTS

| | | | |
|---|---|---|---|
| 4,539,061 | 9/1985 | Sagiv | 156/278 |
| 4,779,961 | 10/1988 | DeMartino | 350/350 R |
| 4,792,208 | 12/1988 | Ulman et al. | 350/96.34 |
| 4,796,971 | 1/1989 | Robello et al. | 350/96.34 |
| 4,807,968 | 2/1989 | Leslie | 350/311 |
| 4,818,616 | 4/1989 | Milverton et al. | 428/411.1 |
| 4,828,758 | 5/1989 | Gillberg-LaForce et al. | 252/582 |
| 4,877,298 | 10/1989 | Teng et al. | 350/96.14 |
| 4,886,339 | 12/1989 | Scozzafava et al. | 350/96.34 |
| 4,900,127 | 2/1990 | Robello et al. | 350/96.34 |
| 4,935,292 | 6/1990 | Marks et al. | 428/220 |

OTHER PUBLICATIONS

"Rational Design and Construction of Polymers with Large Second-Order Optical Nonlinearities. Synthetic Strategies for Enhanced Chromophore Number Densities and Frequency Doubling Temporal Stabilities," Hubbard et al., *Mol. Cryst. Liq. Cryst.*, 1990, pp. 93-106.
"Chromophore-Functionalized Polymeric Thin-Film Nonlinear Optical Materials, Effects of in Situ Cross-Linking on Second Harmonic Generation Temporal Characteristics," Marks et al., *Chemistry of Materials*, 1990, pp. 229-231.
"Chromophoric Self-Assembled Multilayers, Organic Superlattices Approaches to Thin-Film Nonlinear Optical Materials," Li et al., *J. Am. Chem. Soc.*, 1990, pp. 7389-7390.

Primary Examiner—Bernard Pianalto
Attorney, Agent, or Firm—Welsh & Katz, Ltd.

[57] ABSTRACT

Polymer-based second harmonic generation materials are disclosed, including electric field poled, chromophore-functionalized polyphenylene ethers with second harmonic coefficients ($d_{33}$) as high as $65 \times 10^{-9}$ esu, $T_g \approx 173°$ C., and with superior temporal stability of the poling-induced chromophore orientation. Procedures for simultaneously poling and diepoxide cross-linking chromophore-functionalized poly($p$-hydroxystyrene) are set forth, resulting in a significant improvement in the temporal stability of chromophore orientation. Chromophore immobilization is disclosed involving highly cross-linkable epoxy matrices. In a first procedure chromophore molecules are embedded in a matrix which can be simultaneously poled and thermally cured. In a second procedure, a functionalized high-$\beta$ chromophore is synthesized for use as an epoxy matrix component.

19 Claims, 5 Drawing Sheets n = 0, 2

SELF-ASSEMBLED SUPER LATTICES

FIELD OF THE INVENTION

This invention relates to materials with nonlinear optical properties, and the methods for the preparation of such materials.

BACKGROUND OF THE INVENTION

The current interest in nonlinear optical (NLO) materials based upon π-electron chromophores stems from the demonstrated possibilities of large nonresonant susceptibilities, ultrafast response times, low dielectric constants, high optical damage thresholds, and the intrinsic tailorability of the constituent structures. When such materials incorporate glassy polymeric architectures, the additional attractive characteristics of supermolecular organization, improved mechanical/dimensional stability, improved optical transparency, and processability into thin-film waveguide structures is possible. Nevertheless, the progression from the above ideas to efficient NLO materials has presented great challenges, and numerous obstacles remain to be surmounted.

For polymer-based second harmonic generation (SHG), $X^2$ materials, the crucial synthetic problem is to maximize the number density of component high-$\beta$ chromophore molecules while achieving and preserving maximum acentricity of the microstructure. One early approach to such materials was to "dope" NLO chromophores into glassy polymer matrices and then to align the dipolar chromophore molecules with a strong electric field in a procedure called poling. The performance of such materials is limited by the low chromophore number densities which can be achieved before phase separation occurs and the physical aging/structural relaxation characteristics of all glassy polymers, which lead the randomization of the poling-induced preferential chromophore orientation. Hence, the SHG efficiency of such "guest-host" materials is generally short-lived. In addition, it has been observed that the chromophore constituents are not strongly bound in such matrices and that these materials readily undergo dielectric breakdown during poling. A second approach to the construction of efficient film-based SHG materials has been to incorporate NLO chromophores into Langmuir-Blodgett (LB) films. A priori, such an approach offers far greater net chromophore alignment than is possible in the poling field, where net alignment is statistically determined, temporal stability of the chromophore alignment, and controlled film thickness. While preliminary results with LB film-based NLO have been encouraging, significant problems arise from the fragility of the films, the temporal instability of chromophore alignment, the problem of scattering microdomains, and the structural regularity of layer deposition that is possible.

Poled Chromophore-Functionalized Polymers

A first step in ameliorating many of the deficiencies of the aforementioned guest-host materials has been to covalently bind NLO chromophores to selected polymer carriers. Initial work emphasized functionalized polystyrene and poly(p-hydroxystyrene) systems. These materials provide greatly enhanced chromophore number densities, greater SHG temporal stability, improved stability with respect to contact poling-induced dielectric breakdown, and enhanced chemical stability. It was found that contact poling fields as large as 1.8 MV/cm and $d_{33}$ values as high as $19 \times 10^{-9}$ ESU, greater than the corresponding coefficient for $LiNbO_3$, could be realized. Considerably enhanced SHG temporal stabilities were also observed. Nevertheless, neither optimum chromophore number densities nor maximum chromophore immobilization could be achieved in these first-generation systems.

Thus, in such first generation systems, by increasing realizable chromophore number densities while impeding structural disorientation processes following electric field poling, chromophore-functionalized glassy polymers represent an advance in macromolecular second harmonic generation (SHG) materials. Nevertheless, structural relaxation/physical aging processes, which erode poling-induced noncentrosymmetry and hence limit. SHG temporal stability, have not been microscopically well-understood or subject to additional chemical control in such materials. The latter issue might, in principle, be addressable by using a chromophore-functionalized macromolecule having additional chemical functionality, resulting from simultaneously poling and chemically cross-linking a chromophore-functionalized NLO polymer. Such films are insoluble in all common organic solvents and far more resistant to cracking than non-cross-linked films. Good transparency characteristics are also noted. Such a second generation system is prepared by mixing a chromophore-functionalized glossy polymer such as poly(p-hydroxystyrene) functionalized with N-(4-nitrophenyl-5-prolinol$_n$ with a cross-linking agent such as 1,2,7,8-diepoxyoctane.

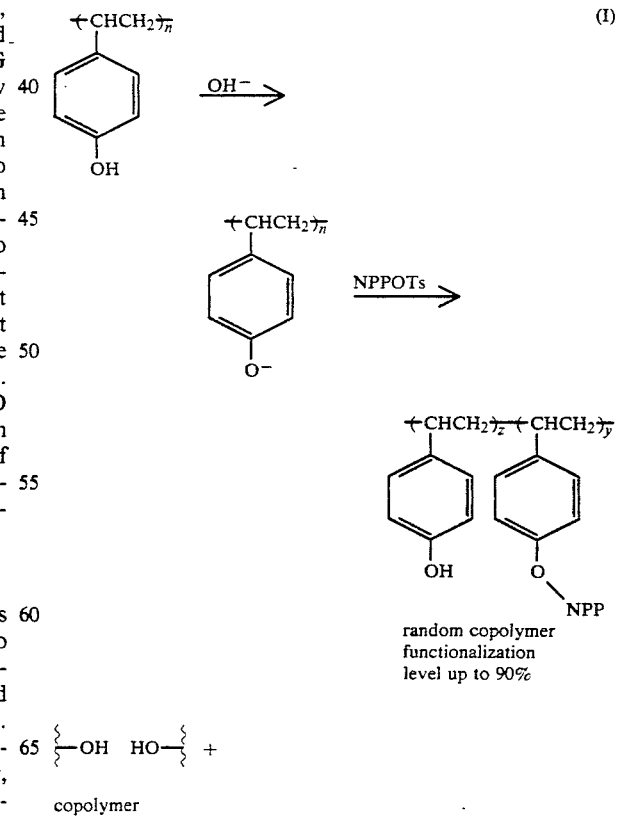

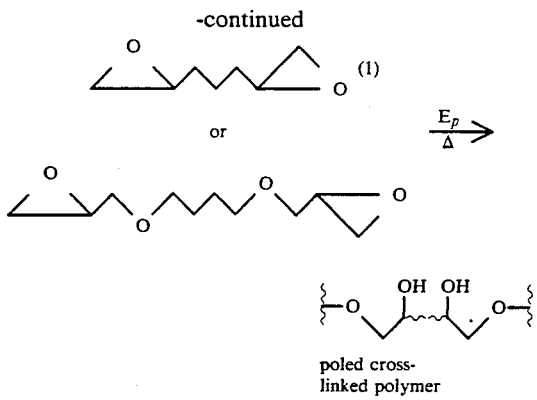

Films of this mixture are prepared and then simultaneously poled and thermally cured (Reaction I).

An alternative approach to poled polymers and LB films would be the construction of covalently linked, chromophore-containing multilayer structures. In principle, such materials could offer greater net chromophore alignment and number densities than poled films and far greater structural control and stability than LB films.

SUMMARY OF THE INVENTION

These and other objects are attained in accordance with the subject invention, wherein a superlattice NLO material and method for preparing such a superlattice NLO material as shown in FIG. 1 is employed, where the basic siloxane technology in a preferred embodiment follows from reactions developed by Sagiv and taught in U.S. Pat. No. 4,539,061. The exact chemistry employed is presented in FIGS. 2, 3, 4, and 5. Noteworthy features include the use of a stilbazole chromophore precursor in which the layer-building quaternization reaction simultaneously affords a high-$\beta$ chromophore center and readily monitored changes in the optical spectrum. In addition, soft, polymeric layers are introduced transverse to the stacking direction to enhance structural stability. The course of multilayer evolution on clean $SiO_2$ substrates is readily monitored by uv-visible spectroscopy (growth of the chromophore absorption); XPS spectroscopy (initial diminution of Si, O signals; growth and persistence of I, C, N signals); advancing contact angle measurements, which are in agreement with the expected properties of the surface functionalities; preliminary ellipsometry measurements, which are in accord with expected dimensions (approximate sublayer thicknesses in the notation of Scheme V: $C_pCh \approx 22$ Å; Si $\approx 12$ Å; PVA $\approx 10$ Å); and NLO characteristics. ($C_p$=coupling spacer; Ch=chromophore; PVA=polyvinylalcohol) The multilayer structures adhere strongly to glass, are insoluble in common organic solvents as well as strong acids, and can only be effectively removed by diamond polishing.

Therefore, an object of the subject invention is the preparation of efficient thin film-based SHG materials by the incorporation of NLO chromophores into covalently interlinked multilayer films. Langmuir-Blodgett (LB) films.

Another object of the subject invention is an alternate method of preparation of thin film NLO materials utilizing a sequential construction of covalently self-assembled chromophore-containing multilayer structures.

Further, objects of the invention, together with additional features contributing thereto and advantages occurring therefrom, will be apparent from the following description of one embodiment of the invention when read in conjunction with the accompanying drawings wherein:

DETAILED DESCRIPTION OF A PREFERRED EMBODIMENTS OF THE INVENTION

Figure 1A:
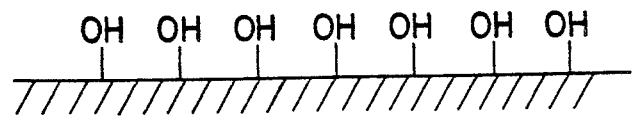
FIG. 1(a)–1(d) shows the general steps in the self-assembly technique of the subject invention for preparing NLO materials.
Figure 1B:
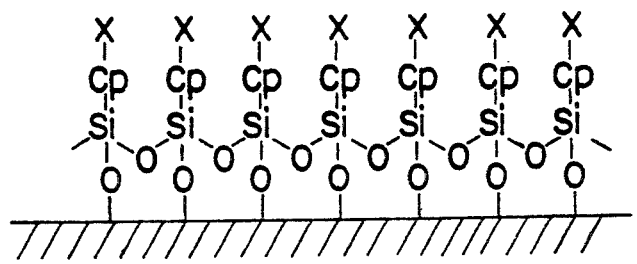
Figure 1C:
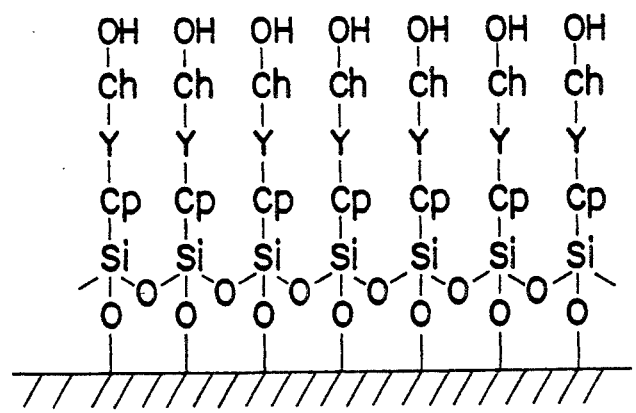
Figure 1D:
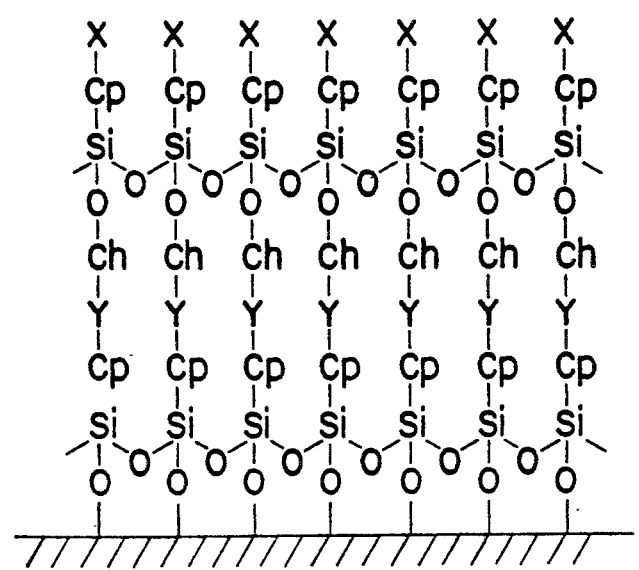

As set forth in FIG. 1, the covalently linked NLO layers of the subject invention are formed by first preparing a defined substrate which comprises in general a surface having polar reactive groups, such as a hydroxyl (—OH) group.

The key step in the process comprises first forming a monolayer of molecules having a terminal polar group at one end, and a non-polar one at the other end of the molecular or at any other position along the molecule, and after forming the first compact monolayer by self-assembly on the defined substrate; activating the monolayer by introducing polar sites for the anchoring of an additional monolayer on top of the activated one, of similar nature as the first one; and repeating the activation and application of a further monolayer until the desired number of layers is attained. For example, the activation can be achieved by using bifunctional surfactant provided with a terminal non-polar function that may be chemically modified into a polar group during the activation step.

Bifunctional monolayer-building components should conform to the following general requirements:

Molecules that are structurally compatible with self-association into compact ordered arrays:

(a) Rod-like molecules containing elongated nonpolar (hydrophobic) moieties, such as derivatives of long chain saturated and unsaturated hydrocarbons and fluorocarbons, steroids, and other elongated polycyclic compounds.

(b) Disk-like, flattened molecules, such as derivatives of sugars, crown ethers, phthalocyanines, porphyrins, and any other aliphatic or aromatic molecule containing a large cyclic or polycyclic moiety.

Molecules of type (a) or (b) containing one or several polar "head" groups (active groups) that bind to polar solid substrates, and one or several non-polar groups (inert groups) that cannot bind to substrate surfaces or to monolayer covered surfaces, but are chemically convertible into appropriate active groups via appropriate surface reactions performed on the compound in the absorbed state. The requirement for nonpolar functions exhibiting inert-active dual character is necessary to ensure that the monolayer-to-surface anchoring proceeds through the polar head groups only, that the molecules assume proper orientation in the film and that the adsorption process stops with the completion of a well-defined monolayer film, while providing a route for triggering the continuation of the process under conditions of precise external control.

The monolayer-to-substrate and monolayer-to-monolayer mode of binding may be covalent, ionic, hydrogen bridge, or complex formation, the only special requirement being that the strength of binding be compatible with the conditions of the subsequent chemical reaction employed for the activation of the non-polar function.

Solids suitable as substrates for anchoring self-assembling monolayers should conform to the following requirements: any solid material exposing a high energy (polar) surface to which monolayer forming molecules can bind by any of the binding modes mentioned above. These may include: metals, metal oxides, semiconductors, glasses, silica, quartz, salts, organic and inorganic polymers, organic and inorganic crystals and the like.

The fluid phase containing the monolayer forming molecules, from which adsorption is performed, may be any fluid, i.e., solutions in organic or aqueous solvents, the melt of the adsorbate, or the vapor phase of the adsorbate.

Typical suitable molecules for use in the construction of such multilayer films are, for example, (a) normal paraffinic long chain molecules with hydrocarbon chains longer than 12 carbon atoms, containing a transoid ethylenic double bond at any position along the chain, and substituted at one end of anyone of the polar anchoring groups mentioned below; (b) as (a), but partially or fully fluorinated chains, starting with 8 carbon atoms; (c) as (a) or (b), but containing more than one ethylenic double bond; (d) as (a) or (b), or (c), but replacing the double bond by acetylenic triple bond or a terminal diacetylene group; (e) as (c), but replacing one double bond by an acetylene triple bond or a diacetylene group; (f) as (a) or (b), but replacing the double bond by a terminal non-polar function, which may be any of the functional groups listed below; (g) cholestane and cholestene derivatives substituted at one end (position 3 for example) by any one of the polar anchoring groups listed below, and containing an ethylenic or acetylenic group in the paraffinic side chain; (h) as (g) but replacing the double or the triple bond by a terminal non-polar function on the side chain, which may be any of the functional groups listed below; (i) androstane and androstene derivatives substituted at one end of the elongated polycyclic backbone by a polar anchoring group and at the other end by a non-polar functional group. The polar and non-polar groups may be any of the groups listed in the respective groups below; (j) phospholipids and glycerol long chain derivatives containing one, two, or three paraffinic chains per molecule, substituted at the ends (of one or more of the chains) by any of one of the non-polar functional groups listed below; (k) cyclodextrin derivatives provided on one side of the ring with non-polar substituent groups of the type listed below; (l) porphyrines and phthalocyanines substituted with polar anchoring groups and non-polar functional groups.

In the preferred approach to achieving noncentrosymmetric structures having a very high degree of chromophore alignment, which is acentric by definition, comprise the starting point. By this approach, the chromophore molecules in solution are given some organizational "help" by coupling their molecular functionalities with functional groups on the surface. Inorganic oxides (in the form of crystals or thin films) are chosen as the desired substrates because oxides yield satisfactory hydrophilic metal hydroxyl groups on the surface upon proper treatment. These hydroxyl groups react readily with a variety of silyl coupling reagents to introduce desired coupling functionalities that can in turn facilitate the introduction of organic high-$\beta$ NLO chromophores. This sequential procedure requires one step which attaches the reactive silyl groups to the hydroxyl surface, and a second which attaches the chromophore to the silyl surface. The separation of the functional groups involving these two steps is necessary to avoid a polymerization reaction in the direction away from the surface. The general strategy of the above procedure is summarized below, where Cp and Ch represent coupling spacers and high-$\beta$ chromophores, respectively.

The choices of Cp has a great degree of flexibility, and include a bifunctional reagent having two points of reactivity at opposite sides of the molecule. In the preferred embodiment one side has reactive —SiCl$_3$, —SiBr$_3$, —SiI$_3$, —Si(OR)$_3$ (R=alkyl group C=1-10) or —Si(NR$_2$)$_3$ groups (R=alkyl group C=1-10). Other embodiments might have —CO$_2$H or —SH groups. The other end of the molecule should have an electrophilic but reactive group such as an alkyl or aryl halide or sulfonate. In the preferred embodiment it is a benzyl halide.

Figure 4A:
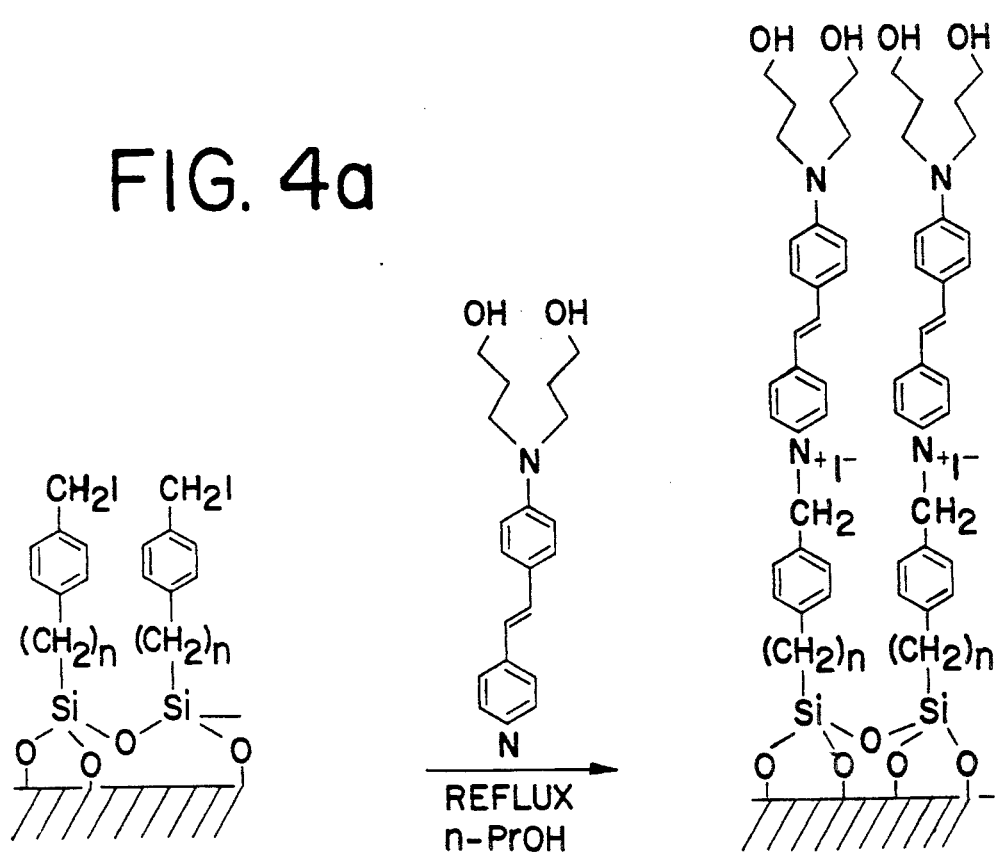

The choice of Ch is rather limited because most good charge transfer chromophores are donor-acceptor pairs having amino or substituted amino groups combined with cyano or nitro groups. The chromophore layer is the key component that gives rise to the NLO properties. It must also be bifunctional, with one end reacting preferentially with the exposed reactive end groups of the previously attached/deposited coupling layer. The preferred chromophore is shown in FIG. 4(a). Other possible chromophores are shown below. The chromophore used should have high $\beta$ values (molecular NLO coefficient)

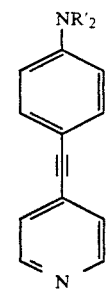

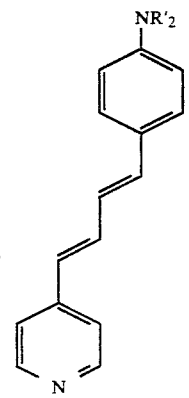

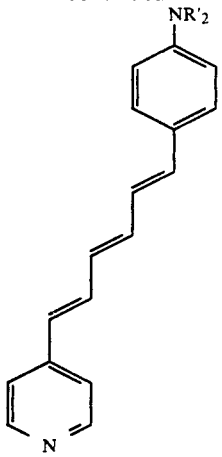

along the long axis of the chromophore. In the preferred embodiment, the other end of the chromophore molecule has alcohol groups (CH₂OH). Also possible would be amine (—CH₂NH₂), olefin (—CH=CH₂), or other reactive groups. These are for joining the chromophore layer to the next layer(s) to be deposited on top of them: the structural layers. Amino groups allow the introduction of other functionalizations but cyano and nitro groups are essentially a "dead end" from a synthetic point of view (i.e., have no available reactive functionality). Therefore, a group or structure which has the desired electron acceptor properties, and also has synthetic flexibility must be identified. The pyridinium structure possesses both of these characteristics. The nonaromatic analog to the pyridinium cation, trimethylammonium, (—N⁺Me₃ group) has an electron withdrawing parameter $\sigma_p = +0.82$–$0.96$ derived from Hammett free energy relationship which is even larger than that of the nitro group ($\sigma_p = +0.81$), the best acceptor currently being used in organic NLO materials. Moreover, while the nitro and cyano groups are monofunctional groups, the pyridine structure has bifunctional properties (electron withdrawing and synthetic bonding abilities). These characteristics enable the incorporation of the pyridinium structure onto the surface without blocking subsequent layer formation and hence allow great flexibility in the molecular architectural design.

Figure 5:
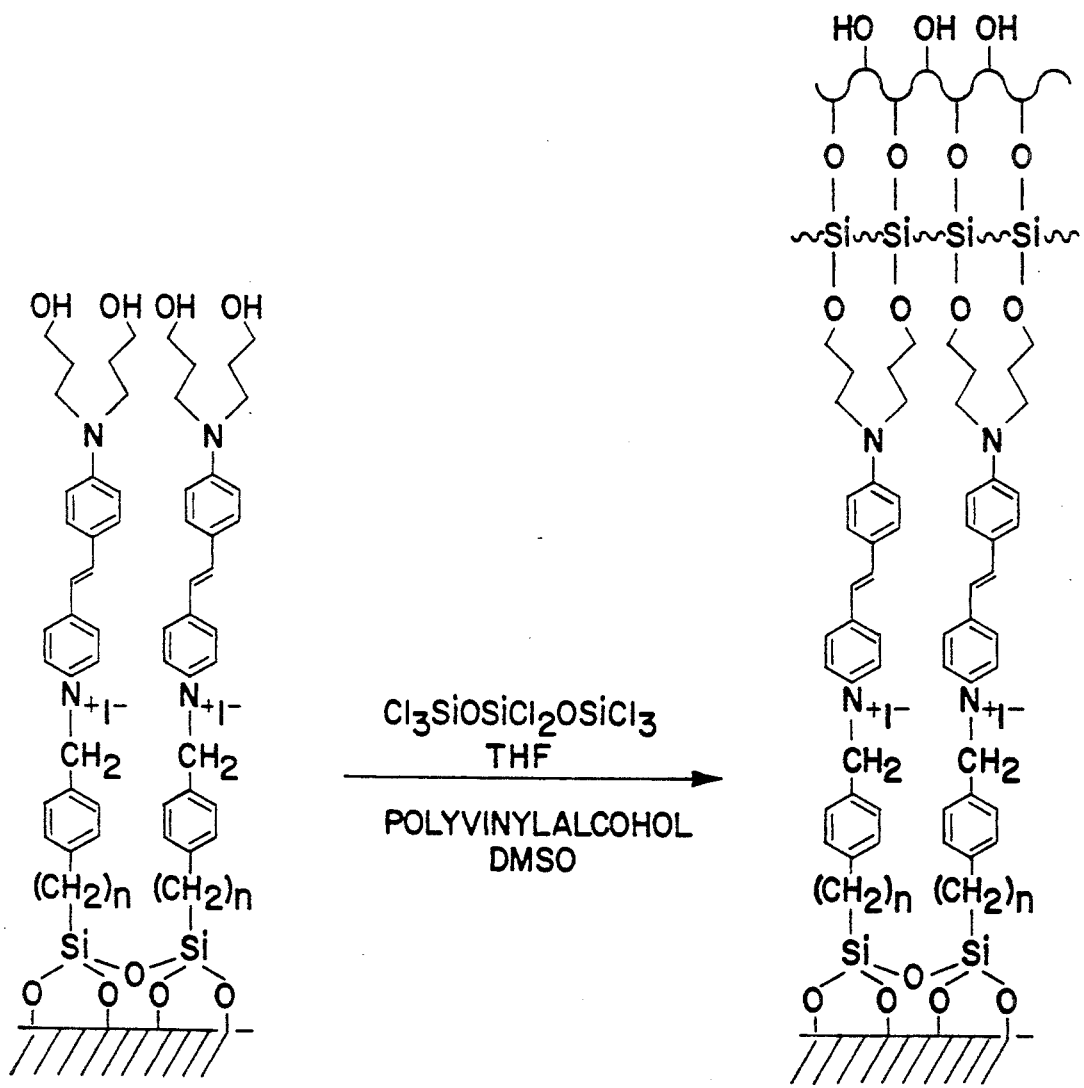

Coupling molecular functionalities into purposely oriented organized entities provides synthetic steric interlocking of the rod-like chromophore, but such interlocking is not strong enough to prevent large dipole-dipole interactions which will lead to randomization of orientation. In order to keep the chromophores "standing up" on the surface of the substrate, structural interlocking or crosslinking of the chromophore arrays into a three-dimensional network of structural layers are provided in a step subsequent to the formation of the chromophore layer. The structural layers may consist of bifunctional silicon reagents (Cl₃SiOSiCl₂OSiCl₃) in the preferred embodiment) possibly combined with a polymer or any other polyfunctional reagent (polyvinylalcohol in the preferred embodiment) which help to stabilize the structure (keep the chromophore molecules "standing up"). Other silicon reagents could be SiX₄ compounds (X=halide, OR, NR₂ R=alkyl group C=1-10) or X₃Si—Y—SiX₃ reagents where Y is some bridging group such as a multifunctional alkyl (C=1-10), aryl, or metal organic group. Other polyfunctional reagents would be polyols (e.g., ethylene glycol), polyamines (e.g., ethylene diamine), and other polymers having reactive groups (olefin, etc.). This step involves double crosslinking of the chromophore layer surface with octachlorotrisiloxane in THF (Si layer) and is followed by reacting the freshly generated Si surface with polyvinylalcohol (PVA) in DMSO (PVA layer) to lock the chromophore orientations (FIG. 5). Such structural interlocking proves to be very effective in terms of preventing dipole randomizations.

Synthesis of Coupling Spacers

Trichlorosilanes are excellent silylating reagents and such would be a good choice for attachment to a hydroxylic surface. Since a pyridinium structure was chosen as the desired acceptor in the chromophore block, one needs a group that will form a bonding interaction in the form of a pyridinum salt. A suitable choice for this purpose is a benzylic or allylic halide. p-(Chloromethyl)phenyl trichlorosilane was selected as the first coupling reagent because it combines these two functionalities and because of the rigidity of the phenyl ring. Although benzyl chloride reacts readily with pyridine in solution, it is inert to the stilbazole structure on a surface because of steric limitations. Benzyl iodide can couple with pyridine readily at relatively mild conditions. Therefore, it would be desirable to use p-(iodomethyl) phenyltrichlorosilane. Unfortunately, this structure is subject to very fast exchange of benzylic and silylic halides (Reaction II).

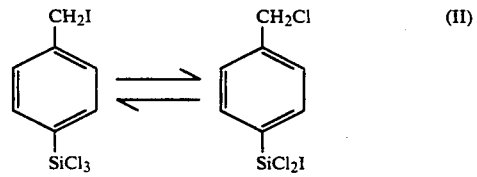

Advantage of the halide exchange reactions can be taken, however, to synthesize p-(iodomethyl) phenyltriiodosilane (Reaction III).

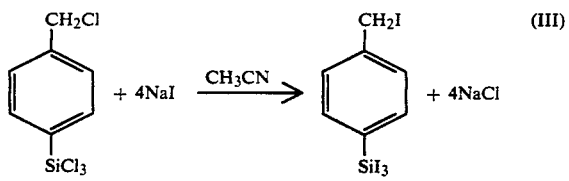

This is a very active species with a shelf life of about a few weeks, primarily because the Si—I bond is very weak and may react with all organic oxygen containing compounds. The rigidity of the phenyl ring introduces strong coupling between the self-assembled film and substrate. As a result, films prepared with this coupling reagent are unstable to laser radiation (SHG decays with time). In order to overcome these strong interactions between monolayers and substrates, a flexible spacer can be introduced. Commercially available 1-trichlorosilyl-2-(m, p -chloromethylphenyl) ethane can be converted to the corresponding iodo analog 1-triiodosilyl-2-(m, p- iodomethylphenyl) ethane by using the technique just described (Reaction IV). This new coupling reagent gives greatly improved film stability. Its analog, 1- dimethyliodosilyl-2- (m,p-iodo-methylphenyl) ethane, can also be prepared this way and its silylation ability is

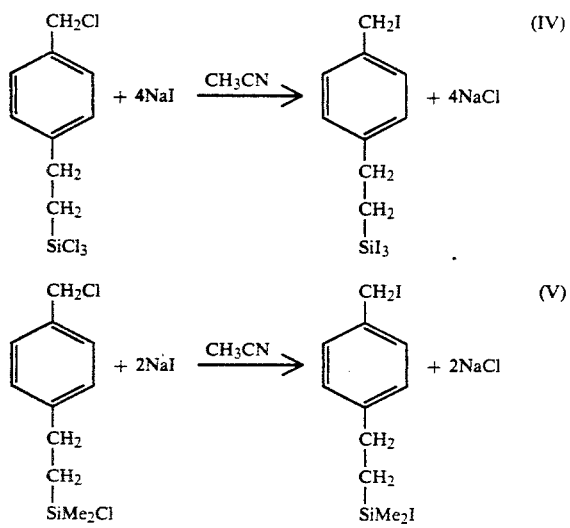

just as good as 1-triiodosilyl-2-(m, p- iodomethylphenyl) ethane (see Reaction V). These aromatic coupling reagents can be stored under argon in the dark for about two weeks prior to use, whereas aliphatic triiodosilanes are only good when generated in situ. These halide exchange reactions (III–IV) can be easily monitored by the shift of benzyl proton from $\delta=4.60$ ppm for chlorides to $\delta=4.44$ ppm for the iodides. Aromatic triiodosilanes are relatively more stable than aliphatic triiodosilanes. For the former, one obtains a nice NMR spectrum is obtained, whereas for the latter, NMR yields relatively broad lines indicating decomposition has already begun after 24 hours.

Synthesis of Chromophore Blocks

Figure 2A:
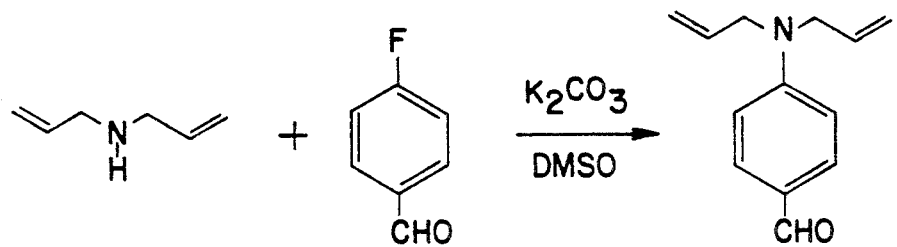
FIG. 2(a), 2(b), 3(a), 3(b), 4(a), 4(b), and 5 show sequential steps in synthesis of the NLO material of the subject invention.
Figure 2B:
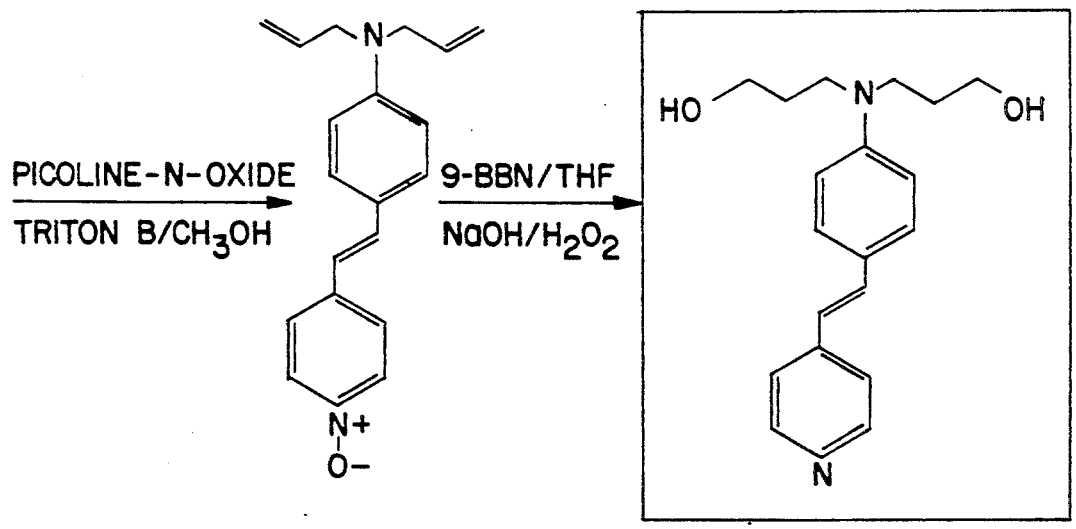

Synthesis of the structural chromophore building blocks is summarized in FIG. 2. p-Fluorobenzaldehyde can be converted to diallylaminobenzaldehyde by refluxing with diallylamine in DMSO in the presence of $K_2CO_3$. By treating diallyaminobenzaldehyde with $\tau$-picoline-N-oxide in dry methanol with Triton B as a catalyst, one obtains yellow crystalline diallylaminostyryl pyridine-N-oxide. The reason for using $\tau$-picoline-N-oxide instead of $\tau$-picoline is that $\tau$-picoline is not sufficiently reactive with benzaldehyde and commonly it must be converted to a pyridinium salt before coupling it with the benzaldehyde. The pyridinium salt may then be hydrolyzed to obtain free base. This cyclic procedure is very inefficient and the total yield was very low. Treating the pyridine-N-oxide dye with excess 9-borabicyclononane (9-BBN) in THF, the desired molecular building block, bis (3-hydroxylpropylaminosyryl) pyridine was obtained. This reaction can be understood as a three step process. First 9-BBN adds to the allyl double bonds. The excess 9-BBN reduces the pyridine-N-oxide to pyridine, then by adding $H_2O_2$ and NaOH the boron-carbon bond is cleaved to yield the final product of bis(3-hydroxylpropylaminostyryl) pyridine. The absence of stilbazole-N-oxide in the final product can be conveniently monitored by the shift of $^1H$ NMR from 8.08 ppm to 8.44 ppm.

Coupling Layer Formation On the Surfaces

Silica, defined as substances with the stoichiometric composition $SiO_2$, exists in various forms including hydrated species with the composition $SiO_2 . H_2O$. The water is chemically bound in nonstoichiometric amounts.

The processes that can occur at the interfaces of silica and aqueous solution are very complex and difficult to interpret, and are critical to surface cleaning and self-assembling chemistry on the surface. Alkaline processes (NaOH aq.) are used herein because the amount of soluble silica remains nearly constant in acidic solution despite the varying degree of hydrolysis of $SiO_2$ on the surface. In the aqueous base solution, however, the solubility of silica increases dramatically due to the formation of silicate ions in addition to monosilic acid. This process will generate a fresh hydroxylated surface layer on the silica substrates while the siloxane bond on the surface is cleaved to form vicinal hydroxyl groups (Reaction VI). High surface hydroxyl densities on the silica glass can be obtained by sonicating the glass substrates in an aqueous base bath.

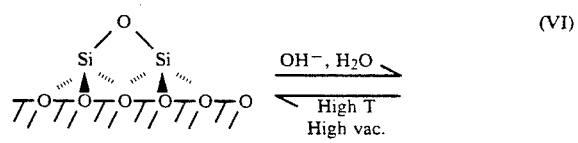

These substrates are desirable for silylation. Similar base treatment by other inorganic oxide surfaces such as ITO film ($In_2O_3 . xSnO_2$) can also generate high hydroxyl density on the surface. The hydroxyl groups on the surface will anchor and orient any molecules which have functionalities that can couple with hydroxyl groups (see FIGS. 3(a) and 3(b)). Molecules such as organosilanes with hydrophilic functional groups can orient to form self-assembled monolayers on both sides of the glass surface. Organosilanes which have a general formula of $R_2SiX_{(4-n)}$ are ideal for the formation of molecular assemblies with their two classes of functionality. The halogen X is involved in the reaction with the surface of inorganic substrate, in which the hydrolyzable bond between X and silicon atom in the coupling agent is replaced by a covalent linkage with the inorganic substrate. The non-hydrolyzable organic group possess a latent functionality which will enable the coupling agent to link with an organic chromophore in subsequent steps.

Figure 3A:
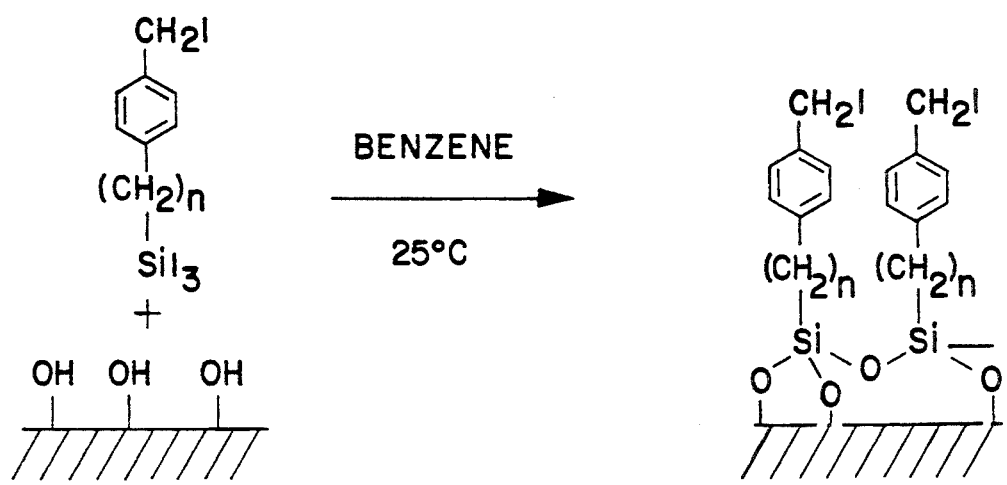
Figure 3B:
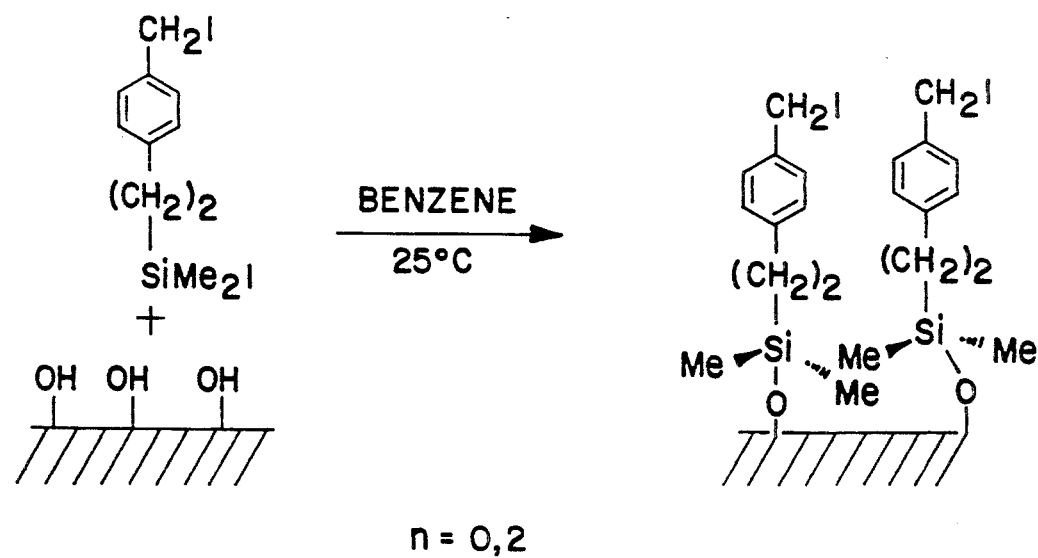

The coupling layer (Cp layer) is applied by immersing the freshly cleaned substrates into a benzene solution of 1-m,p -iodomethylphenyl-2-triiodosilylethane (see FIG. 3(a) and 3(b)). It reacts smoothly with freshly generated hydroxyl groups on the various cleaned surface: $SiO_2$, ITO film ($SnO_2 . xIn_2O_3$) Ge and Si. Typical substrates used in SHG measurements are soda lime glass and ITO glass because of their excellent transparency in the near-IR and visible regions. The completion of this coupling reaction can be verified easily by measuring the static advancing contact angle of the substrates before and after the reaction. Typically the change is remarkable from a cleaned smooth substrate with an advancing $\Theta_a(H_2O)$ contact angle of ~15° with water to a silylated surface with a contact angle of approximately 82°. The reaction can be also monitored by measuring the electrical conductivity of the conductive ITO substrate before and after the reaction. Again, the presence of the organic monolayer is obvious because the conductive ITO surface becomes insulating after being silylated with silyl iodides.

Synthesis Of The Chromophore Layer

Figure 4B:
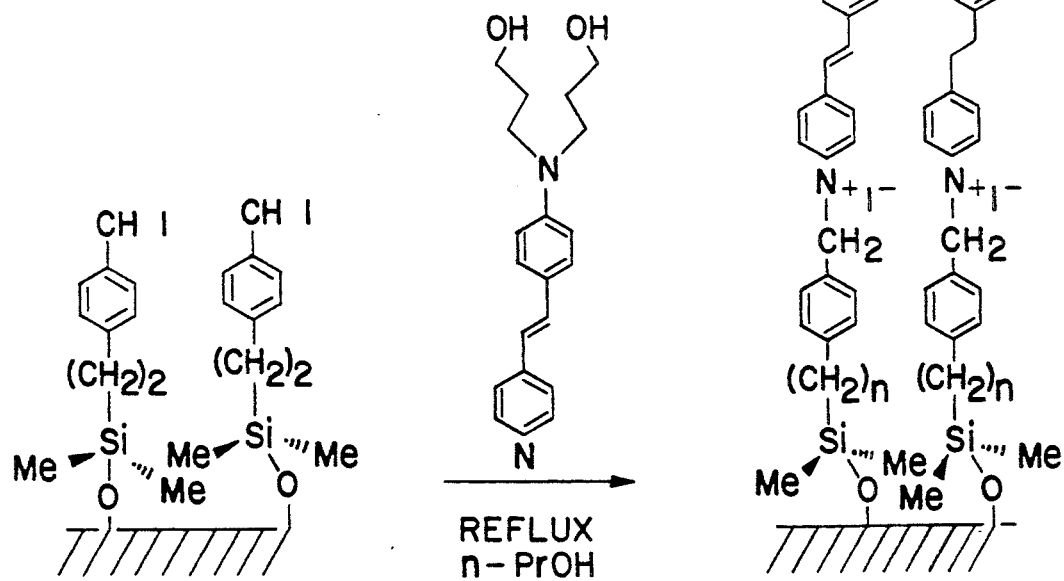

The chromophore layer (Ch layer) can be generated by refluxing the silylated substrates in a solution of n-propanol and p-bis(3-hydroxylpropyl)aminostyrylpyridine (see FIGS. 4(a) and 4(b)). The reason that p-bis(3-hydroxylpropyl)aminostyrylpyridine is chosen as the desired chromophore is that the pyridine group is bifunctional and has highly nonlinear optical properties.

The purity of 4-N(N,N-bis(3-hydroxylpropyl)aminostyryl)pyridine is very important for chromophore layer formation and we have found that trace amounts of 4-[N,N-bis(3-hydroxylpropyl)aminostyryl]pyridine-N-oxide will hinder the chromophore layer formation reaction.

EXAMPLES

Solvents were freshly distilled prior to use. $CHCl_3$ and benzene were distilled over $P_2O_5$ twice and stored under argon. $CH_3CN$ was dried over 4 Å molecular sieves and then distilled over $CaH_2$ and stored under argon. THF was dried with HOH and then distilled and stored over HOH. DMSO and n-propanol were used without any pre-treatment. All chemicals are from Adrich Chemical Co. except the silanes which are obtained from Petrarch Systems Silanes and Silicones.

Proton and carbon magnetic resonance spectra were recorded on a Varian XL-400 MHz instrument. Mass spectral data were recorded on a Hewett-Packard 5985 GC/MS instrument with 70eV ionizing voltage and direct injection technique.

p-(Iodomethyl)phenyltriiodosilane

Under argon, NaI, 2.35g (15.7mmol) was dissolved in 15 ml pre-dried acetonitrile in a 100 ml flame-dried three neck flask equipped with a filtration apparatus. The whole apparatus was covered with aluminum foil because the iodide compounds are light sensitive. To this solution, p-chloromethylphenyltrichlorosilane 0.5 ml (2.6mmol) was added with syringe. A white cloudy precipitate soon appeared, and the mixture was stirred overnight at room temperature (25°). Acetonitrile was next removed under vacuum. To the crude product, 20 ml pre-dried $CHCl_3$ was added and stirred for several hours. The resulting solid was filtered off and the resulting red solution was stored under Ar. $^1H$ NMR($CDCl_3$) $\delta$7.72(2H, d, J=8.4Hz), $\delta$7.48 (2H, d, J=8.4Hz), $\delta$4.44 (2H, s).

1-Triiodosilyl-2-(m,p-iodomethylphenyl)ethane

To a flame dried three neck flask equipped with a Schlenck filtration apparatus, under Ar 2.35 g (15.7mmol) NaI and 15 ml dry $CH_3CN$ was added. When all NaI had dissolved, 0.57 ml (2.61 mmol) of 1-trichlorosilyl-2-(m,p-chloromethylphenyl) ethane was added. The mixture was stirred for 9 hours and then the $CH_3CN$ was removed in vacuo. About 20 ml dried benzene (or $CHCl_3$) was then syringed into the flask and the mixture was stirred for a few hours. The solid (NaI) was filtered off and the red solution was used immediately as the silylation reagent.

1-Dimethyliodosilyl-2-(p,m-iodomethylphenyl)ethane

The title compound was prepared in the same procedure as that described for 1-triiodosilyl-2-(m, p-iodomethylphenyl) ethane.

p-Diallylaminobenzaldehyde

Under an Ar atmosphere, 2.16 ml p-fluorobenzaldehyde and 3 ml DMSO were added sequentially to 3.5 g (30 mmol) of anhydrous $K_2CO_3$, 3.70 ml (20 mmol) diallylamine. With constant stirring, the mixture was heated to about 155°–160° C. After refluxing for 20 hours, the solution became intense red. The mixture was cooled to room temperature and 10 ml distilled water was added to dissolve any inorganic salts and the product was extracted with ether. The water layer was washed with ether several times and the combined organic layers were dried over $MgSO_4$. The ether solution was then filtered and the ether, unreacted starting materials and solvent DMSO were removed by vacuum distillation at 100° C. A very viscous orange red product was left in the flask. Yield=2.05 g (51%). Mass spectrum: $M^+/e$=201. Calcd. $M^+/e$=201.27 Anal. calcd. for $C_{13}H_{15}NO$, C, 77.58; H, 7.51; N, 6.96. Found: C, 77.33; H, 7.33; N, 6.66. $^1H$ NMR($CDCl_3$), $\delta$ 9.71 (1H,s), 7.70 (2H, d, J=9Hz), 6.70 (2H, d, J=9Hz), 5.82 (2H, m), 5.19 (4H, m), 4.00 (4H,t). $^{13}C$ NMR ($CDCl_3$) $\delta$ 189.4, 152.8, 131.8, 116.8, 110.9, 52.22 ppm.

p-Diallylaminostyrylpyridine-N-oxide

To 6.5 g (60mmol) of $\tau$-picoline-N-oxide in a 250 ml three neck flask, 10 g (50 mmol) of diallylaminobenzaldehyde in 60 ml dry methanol and 23 ml Triton B were added sequentially. The red solution was refluxed for 8 hours under a positive pressure of Ar and then the refluxing apparatus was replaced with vacuum distillation apparatus. Methanol was completely removed by vacuum. The mixture appeared yellow initially when it was dry and then it became dark after about one hour. The mixture was taken up in 100 ml $CH_3OH$ and stirred constantly until all products dissolved. The resulting solution was then poured into 1000 ml distilled water. A cloudy yellow precipitate appeared immediately, which slowly changed to an organe colored solution with a red sticky liquid-like product on the bottom of the beaker. The mixture was left overnight to allow complete precipitation. If the diallylaminobenzaldehyde is very pure, yellow crystals will be formed the next day instead of red sticky product on the bottom of the beaker. (a) If yellow crystals were formed, they were filtered off and recrystallized twice from chlorobenzene:hexane (1:4). (b) If a red sticky product was formed, the water-methanol solution was carefully decanted and the red-sticky liquid was washed with more water. The red viscous liquid soon began to solidify at room temperature in the hood. After complete solidification, the red product was dissolved in about 150 ml chlorobenzene. The resulting red solution was filtered and 500 ml hexane added to the filtrate. This solution became cloudy immediately and gave yellow crystals upon standing. The product was recrystallized once again from chlorobenzene/hexane. Yield=4.8 g(33.2%). Mass spectrum: $M^+/e$=292. Calcd. for $C_{19}H_{20}N_2O$, C, 78.05; H, 6.89; N, 9.58. Found: C, 77.96; H, 6.89; N, 9.43. $^1H$ NMR $\delta$ 8.09 7.34 (2H, d, J=8.8Hz), 7.26 (2H, d, J=7.2Hz) 7.04 (1H, d, J=16Hz) 6.67 (1H, d, J=16Hz) 6.66 (2H, d, J=8.8Hz) 5.81 (2H, m), 5.17 (4H, m), 3.95 (4H, t). $^{13}$C NMR (CDCl$_3$) δ 149.2, 145.8, 145.9, 133.6, 133.4, 128.4, 128.4, 125.0, 124.3, 124.1, 121.5, 116.3, 112.2, 52.70.

p-Bis(3-hydroxylpropyl)aminostyrylpyridine

To 0.48 g (1.64 mmol) of diallylaminostyryl-pyridine-N-oxide, under Ar atmosphere, 15 ml 0.5M 9-BBN (7.5 mmol) in THF solution was injected into the three neck flask with a syringe. The solution became red immediately. After stirring it overnight, it changed into dark red. The flask was next cooled in an ice-bath and 3ml 3M NaOH (9mmol) solution (water) was added, followed by the dropwise addition of 3 ml 30% H$_2$O$_2$ (2.94 mmol) over a period of 20-30 minutes. The dark red solution became light-orange and transparent after the addition of the hydrogen peroxide. The light-colored solution was then poured into a saturated aqueous K$_2$CO$_3$ solution. The aqueous layer was extracted three times with THF and then the combined THF solution was dried over MgSO$_4$ for several hours. The drying reagent was filtered off and the THF removed by vacuum. Under Ar, about 300 ml toluene was added to crude product and the mixture heated to reflux temperature, followed by a quick hot filtration. After cooling slowly to room temperature, tiny yellow crystals precipitated out from toluene. Typically, the crude product was recrystallized several times from toluene until nice yellow crystals were obtained and finally recrystallized from 20-30 ml CHCl$_3$. Yield=0.17 g (33.1%). High resolution mass spectrum, M$^+$/e=312.1852; Calcd. for C$_{19}$H$_{24}$N$_2$O$_2$, M$^+$/e=312.1838. $^1$H NMR (DMSO), δ 8.44 (2H, d, J=6Hz), 7.44 (2H, d, J=6Hz), 7.42 (2H, d, J=9.2Hz), 7.38 (1H, d, J=16.4Hz), 6.88 (1H, d, J=16.4Hz), 6.69 (2H, d, J=9.2Hz), 4.56 (1H, t, J=16.4Hz), 3.44 (4H, t, J=6Hz), 3.37 (4H, t, J=7.6Hz), 3.34 (1H, s), 3.31 (1H, s), 1.67 (4H, m). Anal. Calcd. for C$_{19}$H$_{24}$N$_2$O$_2$ . 0.5H$_2$O, C, 71.00; H, 7.84; N, 8.72. Found: C, 71.52; H, 7.69, N, 8.55. λmax=390 (in MeOH).

Substrate Cleaning

Soda lime glass and ITO coated glass substrates were sonicated first in aqueous 1? % detergent (Liqui-Nox) water solution for ten minutes and then in aqueous NaOH for another ten minutes. The substrates were then thorouqhly rinsed with distilled water and AR grade acetone followed by several hours of oxygen plasma cleaning (Harrick Scientific Co.). Silicon wafers can be cleaned in the same manner. Aqueous solutions of NaOH and KOH have little effect on the surface of germanium, and concentrated nitric acid attacks it only superficially. For the Ge ATR prisms, nitric acid is used to treat the germanium crystal surfaces to generate germanium surface oxides and hydroxides. The subsequent cleaning procedures are the same as those described for glass substrates.

Coupling Layer Formation (Cp Layer)

Under an Ar atmosphere, the freshly cleaned substrate (substrates were used within one or two days after cleaning) was immersed into a benzene solution of 1-triiodosilyl-2-(m,p-iodomethylphenyl) ethane which was synthesized in situ with NaI in acetonitrile. It is very important to ensure that both sides of the substrate are not blocked and have good contact with the solution After 24 hours, the substrate was transferred into benzene solution for cleaning purpose. The substrate is sonicated in benzene solution for three times and then sonicated in acetone for three times with one minute duration of each sonication. Θ$_a$(H$_2$O)=82°, XPS shows: Si, O, C, and I present on the surface. UV-vis spectrum λ$_{max}$=195 nm. FTIR-ATR: 2922 cm$^{-1}$ (m), 2850 cm$^{-1}$(m), 1457 cm$^{-1}$(v), 965 cm$^{-1}$(v), 965 cm$^{-1}$(v), 934 cm$^{-1}$(v), 871 cm$^{-1}$(v), 748 cm$^{-1}$(v).

Chromophore Layer Foundation (Ch layer)

Under argon flush, the silylated substrate was immersed in a solution of 5×10$^{-3}$ M 4-(N,N-bis(3-hydroxylpropylamino-styryl)pyridine in n-propanol. It is very important to ensure both sides of the substrate are clear of any possible hindrance and to give a good contact between the surface benzyliodide groups and the corresponding coupling functionalities in solution. The solution was kept refluxing for six days to ensure full coverage of chromophore layer. After cooling the reaction vessel to room temperature, the substrate was rinsed with acetone followed by sonication in acetone for a few times (1-2 minutes for reach sonication). Θ$_a$(H$_2$O)=55°. XPS shows Si, O, C, N, and I present on the surface (initial diminution of Si, O signal; growth and persistence of C, N, I signals in the subsequent multilayer structure). UV-vis spectrum: λ=510 nm, 260 nm, and 195 nm. FTIR-ATR: 2960 cm$^{-1}$(m), 2935 cm$^{-1}$(m), 2869 cm$^{-1}$(m), 2855 cm$^{-1}$(m), 1579 cm$^{-1}$(v), 1521 cm$^{-1}$(v), 1453 cm$^{-1}$(v), 1371 cm$^{-1}$(v), 960 cm$^{-1}$(v), 879 cm$^{-1}$(v), 613 cm$^{-1}$(v).

Silicon Layer Formation (Si Layer)

The CpCH covered substrate was sonicated 5 times for 2 minutes in dry THF to remove any possible water and alcohol molecules which might have been physically absorbed on the surface. The substrate was then immersed into a IM solution of octachlorotrisiloxane and THF, followed by sonication for about 10 minutes to promote uniform distribution of the reagents onto the surface. Θ$_a$(H$_2$))=17°, FTIR-ATR studies show the appearance of very strong absorbances at 1205 cm$^{-1}$ and 1072 cm$^{-1}$ from Si-O-R and Si-O-Si vibration modes respectively.

PVA Layer Formation (PVA Layer)

After coating the Si layer, the substrate was cleaned by sonicating in dry THF to remove any residual siloxane physically absorbed on the surface. The substrate was then dipped into a solution of PVA in DMSO (0.5 g PVA/15 ml DMSO). The crosslinking reaction was allowed to proceed for 10 minutes with ultrasound. The substrate was then sonicated in pure DMSO to remove extra PVA on the surface and finally the DMSO was removed by sonicating the substrate in acetone. Θ$_a$(H$_2$O)=17°. FTIR-ATR 2962 cm$^{-1}$(m), 2932 cm$^-$(m), 2900 cm$^{31}$ $^1$(sh), 2881 cm$^{-1}$(m), 2855 cm$^{-1}$(sh), 1217 cm$^{-1}$(vs), 1081 cm$^{-1}$(vs).

The above processes, i.e., sequential formation of the Cp, Ch, and structural layer formation, is repeated until a multilayer structure is built up. Thus, the coupling layer is reacted with the structural layer (which now serves as a substrate), chromophore is added and then the structural layer, and so on.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. A nonlinear optical material comprising:
   a defined substrate;
   an aromatic silane coupling means bonded to said substrate;
   a chromophore;
   said coupling means and chromophore forming chromophore arrays on said substrate; and
   a structural layer to stabilize said chromophore arrays and form a three-dimensional second-order nonlinear optical material.

2. The NLO material of claim 1 wherein said aromatic silane coupling means comprises a trihalosilane.

3. The NLO material of claim 1 wherein said aromatic silane coupling means is formed from $R_nSiX_{(4-n)}$, where R=alkyl and aryl group and X=halogen.

4. The NLO material of claim 1 wherein said aromatic silane coupling means is formed from compounds selected from the group consisting of:

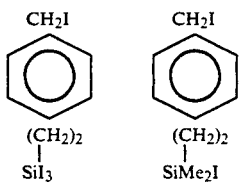

5. The NLO material of claim 1 wherein the said structural layer includes polyvinyl alcohol.

6. The NLO material of claim 1 wherein said defined substrate has polar reactive groups on the 7. The NLO material of claim 6 wherein said polar reactive groups are hydroxyl groups.

8. The NLO material of claim 1 wherein said silane coupling means is a bifunctional molecule with two sites of reactivity on opposite ends of the molecule.

9. The NLO materials of claim 8 wherein said silane coupling means has a first site of reactivity, said first site comprising groups selected from the group consisting of $-SiCl_3$, $-SiBr_3$, $-SiI_3$, $Si(OR)_3$, $Si(NR_2)_3$, or SiRSH where R is an alkyl group with C=1-10.

10. The NLO material of claim 8, wherein said silane coupling means has a second site of reactivity, said second site comprising electrophilic and reactive groups selected from the group consisting of alkyl groups (C=1-10), aryl halides, or sulfonates.

11. The NLO material of claim 1 wherein said chromophore is bifunctional.

12. The NLO material of claim 1 wherein said chromophore is selected from the group consisting of:

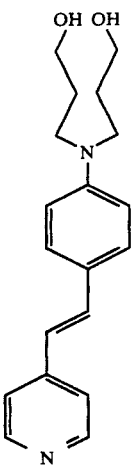

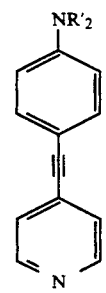

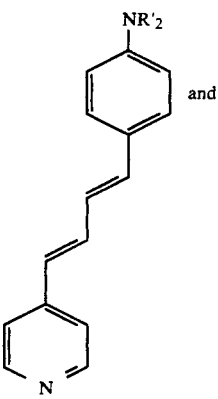

and

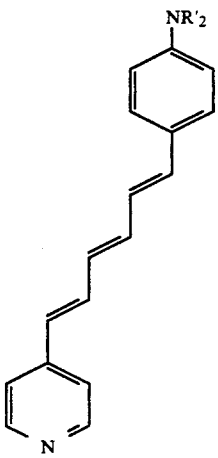

13. The NLO material of claim 1 wherein the said structural layer comprises a bifunctional silicon reagent.

14. The NLO material of claim 13 wherein said bifunctional silicon reagent is combined with a polyfunctional reagent.

15. The NLO material of claim 14 wherein said polyfunctional reagent is selected from the group consisting of polyols, polyamines, and olefins with reactive groups.

16. The NLO material of claim 13 wherein said silicon reagent is selected from the group consisting of $SX_4$ or $X_3SiYSiX_3$ (X=halide, OR, $NR_2$; R=alkyl group, C=1-10; Y=a bridging group).

17. A non-linear optical material comprising chromophores coupled to a substrate in a vertical stacking array, and a structural layer bounded to said chromophores in a plane transverse to the vertical stacking direction.

18. The NLO of claim 17 wherein said chromophores are coupled to said substrate by an organosilane of the formula $R_nSiX_{(4-n)}$ where R=alkyl and aryl combination and X=halogen.

19. The NLO of claim 17 wherein said structural layer comprises polyvinylalcohol.

* * * * *

UNITED STATES PATENT AND TRADEMARK OFFICE
CERTIFICATE OF CORRECTION

PATENT NO. : 5,156,918
DATED : October 20, 1992
INVENTOR(S) : Marks, et al.

It is certified that error appears in the above-identified patent and that said Letters Patent is hereby corrected as shown below:

Column 1, Line 2, add the following new first paragraph:

--This invention was made with Government support under the Air Force Office of Scientific Research (Contract 88-C-0122 and 90-0017). The Government has certain rights under this invention.--

Column 1, Line 11, "x-electron" should be --$\pi$-electron--.

Column 2, Line 33-35, after "prolinol", delete "n" and insert --)--.

Column 10, Line 1, "$SiO_2 \cdot H_2O$" should be --$SiO_2 \bullet H_2O$--.

Column 11, Line 13, "o" should be --of--.

Column 11, Line 58, "(m,p-iodomethvlphenvl")" should be --(m,p-iodomethylphenyl)--.

UNITED STATES PATENT AND TRADEMARK OFFICE
CERTIFICATE OF CORRECTION

PATENT NO. : 5,156,918

DATED : October 20, 1992

INVENTOR(S) : Marks, et al.

It is certified that error appears in the above-identified patent and that said Letters Patent is hereby corrected as shown below:

Column 13, Line 37, ".", first occurrence, should be --x--.

Column 13, Line 43, "1?" should be --10 --.

Column 15, Line 46, after "the", insert --surface--.

Signed and Sealed this

Fourteenth Day of December, 1993

Attest:

BRUCE LEHMAN

Attesting Officer    Commissioner of Patents and Trademarks